(12) United States Patent
Middleby

(10) Patent No.: US 6,921,095 B2
(45) Date of Patent: Jul. 26, 2005

(54) HAND TROLLEY WITH WINCH OPERATED LIFTING CARRIAGE

(76) Inventor: Robert J. Middleby, 31 Faul Street, Adamstown Heights, New South Wales (AU), 2289

( * ) Notice: Subject to any disclaimer, the term of this patent is extended or adjusted under 35 U.S.C. 154(b) by 0 days.

(21) Appl. No.: 10/479,217

(22) PCT Filed: Feb. 28, 2003

(86) PCT No.: PCT/AU03/00251
§ 371 (c)(1),
(2), (4) Date: Mar. 9, 2004

(87) PCT Pub. No.: WO03/072414
PCT Pub. Date: Sep. 4, 2003

(65) Prior Publication Data
US 2004/0155418 A1 Aug. 12, 2004

(30) Foreign Application Priority Data
Feb. 28, 2003 (AU) .............................................. PS0830

(51) Int. Cl.⁷ ............................. B62B 1/00; B62B 3/00; B65F 9/00; B60P 1/04; B66F 1/00
(52) U.S. Cl. ................................ 280/47.29; 280/47.28; 280/47.27; 280/654; 414/490; 254/387; 254/325; D34/26
(58) Field of Search .......................... 280/47.29, 47.28, 280/47.27, 654; 414/490; D34/12, 24, 26; 254/387, 325

(56) References Cited

U.S. PATENT DOCUMENTS

| | | | |
|---|---|---|---|
| 1,799,307 A | | 4/1931 | Manley |
| 2,881,865 A | | 4/1959 | Lewis |
| 2,981,374 A | * | 4/1961 | Holsclaw .................... 187/231 |
| 3,158,354 A | * | 11/1964 | Ward .......................... 254/47 |
| 3,382,988 A | * | 5/1968 | O'Reilly ..................... 414/11 |
| 3,703,240 A | * | 11/1972 | Russell ....................... 414/563 |
| 3,876,039 A | * | 4/1975 | Bushnell, Jr. ............... 187/226 |
| 3,893,679 A | * | 7/1975 | Sumrall ...................... 280/5.3 |
| 3,951,286 A | | 4/1976 | Horst |
| 3,976,039 A | * | 8/1976 | Henault ...................... 123/274 |
| 4,034,878 A | * | 7/1977 | Fox ............................ 414/448 |
| 4,258,826 A | * | 3/1981 | Murray ....................... 182/20 |
| 4,435,115 A | * | 3/1984 | Orstad et al. .............. 414/490 |
| 4,632,627 A | * | 12/1986 | Swallows ................... 414/490 |
| 4,987,976 A | * | 1/1991 | Daugherty ................. 187/243 |
| 5,251,922 A | * | 10/1993 | Mann ....................... 280/47.29 |
| 5,406,996 A | * | 4/1995 | Wagner et al. ............ 141/364 |
| 5,584,363 A | * | 12/1996 | Curtin et al. .............. 187/243 |
| 5,938,396 A | * | 8/1999 | Audet ........................ 414/490 |
| 5,975,826 A | * | 11/1999 | Scholder .................... 414/444 |
| 6,309,168 B1 | | 10/2001 | Holmes |
| 6,315,059 B1 | * | 11/2001 | Geldean ..................... 173/31 |
| 6,371,449 B1 | * | 4/2002 | Chamberlain .............. 254/387 |
| 6,481,694 B2 | * | 11/2002 | Kozak ........................ 254/325 |
| 6,530,740 B2 | * | 3/2003 | Kim ........................... 414/490 |
| 6,599,078 B1 | * | 7/2003 | Elder ......................... 414/542 |
| 6,644,907 B1 | * | 11/2003 | Pinder ....................... 414/424 |

FOREIGN PATENT DOCUMENTS

| | | |
|---|---|---|
| DE | 297 02 783 | 7/1997 |
| WO | WO 02/094703 | 11/2002 |

* cited by examiner

Primary Examiner—Christopher P. Ellis
Assistant Examiner—G B Klebe
(74) Attorney, Agent, or Firm—Nixon & Vanderhye P.C.

(57) ABSTRACT

A hand trolley includes a chassis formed from side frames comprising parallel frame members, wheels and a base platform provided with a load lifting carriage having a lifting surface. The carriage can be raised from a low position on the base platform to an elevated position by operating a hand cranked winch with a crank handle rotatable about an axle located proximate to a hand grip on the chassis rails and parallel to the axis of the wheels. The positioning and orientation of the crank handle allows correct ergonomic use by an operator who can grip the trolley chassis with one hand while controlling and operating the crank handle in an ergonomically sound position.

19 Claims, 5 Drawing Sheets

HAND TROLLEY WITH WINCH OPERATED LIFTING CARRIAGE

This application is the U.S. national phase of international application PCT/AU03/00251, filed Feb. 28, 2003, which designated the U.S., the entire contents of which are hereby incorporated by reference.

FIELD OF THE INVENTION

This invention relates to a hand trolley and has been devised particularly though not solely for the lifting of heavy objects.

BACKGROUND OF THE INVENTION

It is well known to provide hand trolleys for the lifting of heavy objects from a location, typically at ground or floor level, and the transportation of those objects to a different location. Such hand trolleys typically have a pair of support wheels located toward one end of an elongate chassis with a hand grip at the opposite end of the chassis and a load support platform extending outwardly from the chassis adjacent but on the opposite side to the wheels. In use, the operator pushes the load support platform under the load to be lifted until an upright portion of the load rests against the chassis, and then tilts the chassis rearwardly about the wheels to lift the load from the ground, enabling the load to be wheeled to a new location.

It is a disadvantage of conventional hand trolleys of this type, that although they are very suited to moving a heavy load from one location at ground or floor level to another location at the same level, they do not assist the operator in picking up or setting down a load to an elevated position. Such operations typically include the picking up of a load from ground level and elevating the load to a raised position where it can be loaded into a motor vehicle.

Attempts have been made to overcome this problem by providing hand trolleys with lifting tynes that can be raised using a hand winching mechanism when the trolley is in the upright position, but such constructions have suffered from the disadvantage that the winching mechanisms are typically placed in a mid-height position on the underside or rearside of the trolley chassis with the winch cranking axis perpendicular to the axle supporting the wheels. This not only restricts the height to which the lifting tynes can be raised but which also results in an ergonomically unsound position for an operator cranking the winch. This leads to the danger of injury to the operator and furthermore a trolley of this design is inherently unstable while the load is being raised making it prone to toppling and either injuring the operator or damaging the load.

SUMMARY OF THE INVENTION

Accordingly, the present invention provides a hand trolley of the type including a load supporting chassis, a pair of support wheels located toward one end of the chassis, a base platform extending from the chassis adjacent the wheels arranged to support the chassis in a substantially upright position for loading of the trolley, and a hand grip located toward the opposite end of the chassis from the wheels, characterised by the provision of a load lifting carriage slideably mounted to the chassis and a lifting tendon extending from the carriage to a winch located proximate the hand grip on the opposite side of the chassis to the carriage, the winch having an operating handle rotatable about an axle extending transversely relative to the chassis and substantially parallel with the axis of the pair of support wheels.

Preferably the axle of the winch handle is positioned relative to the hand grip so as to facilitate an operator cranking the operating handle in one hand while holding the hand grip in the other hand.

Preferably the tendon comprises a belt anchored at one end to the carriage and extending to the winch.

In one form of the invention, the winch is supported on a bracket extending downwardly and rearwardly, toward the operator, from the hand grip end of the chassis.

Preferably the chassis includes a transverse frame rail extending across the upper end of the chassis and the belt extends over a sheave in the form of a roller rotatably mounted to a bracket secured to the transverse frame rail.

In an alternative form of the invention the winch is mounted below the transverse frame member with the belt extending directly from the carriage to the winch.

Preferably the winch operating handle is extended outwardly beyond the load support chassis to facilitate clear and ergonomically sound movement of the handle.

Preferably the carriage includes a lifting surface extending outwardly from the chassis substantially parallel to the base platform.

BRIEF DESCRIPTION OF THE DRAWINGS

Notwithstanding any other forms that may fall within its scope, one preferred form of the invention will now be described by way of example only with reference to the accompanying drawings in which.

DETAILED DESCRIPTION OF PREFERRED EMBODIMENTS OF THE INVENTION

Figure 1:
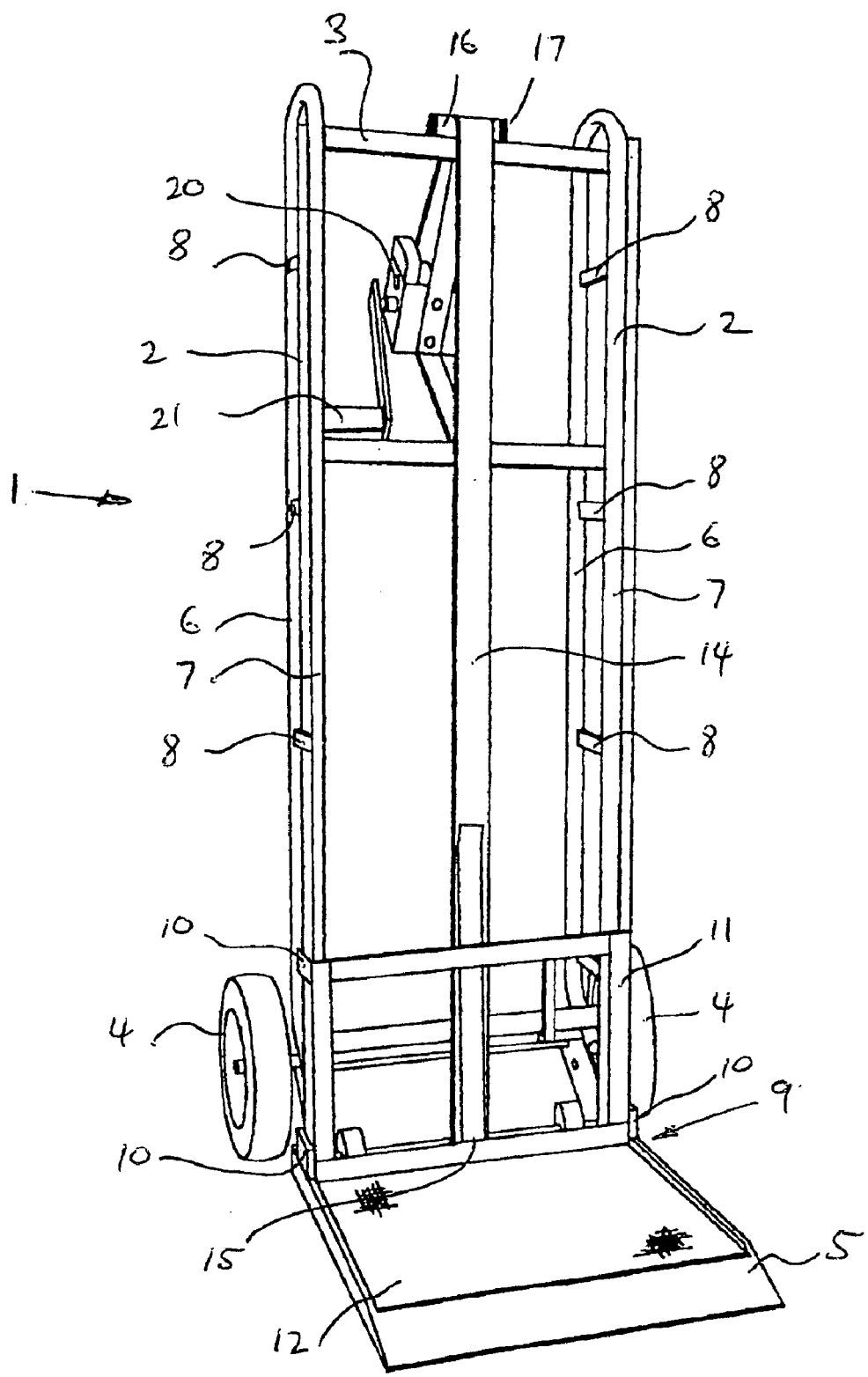
FIG. 1 is a front perspective view of a hand trolley according to the invention with the load lifting carriage in the lowered position.

In the preferred form of the invention, a hand trolley is constructed by modifying a well known type of trolley whose overall construction is generally shown at 1, although it will be appreciated that the trolley can be designed in other forms rather than modifying an existing construction.

The hand trolley includes a load supporting chassis typically including a pair of upright side frames 2 interconnected at their upper ends by a transverse rail 3 and being provided with a pair of support wheels 4 located toward the lower end of the chassis. The wheels 4 are adjacent a base platform 5 extending substantially at right angles to the side frame 2. The upright side frames may each be formed from a pair of parallel tubular frame members 6 and 7 joined by struts 8 or may take any other suitable form such as a single large diameter tube or other structural member.

To form a hand trolley according to the invention, a load lifting carriage 9 is provided slideably mounted to the side frames 2 by way of guides 10 which may include friction reducing rollers (not shown). The carriage typically has an upright back portion 11 and a lifting surface 12 extending outwardly from the chassis substantially parallel to the base platform 5. The lifting surface may be a planar platform as shown, or other suitable configurations such as a pair of tynes.

The trolley is further provided with a lifting tendon 14 preferably in the form of a flat webbing belt, anchored at one end 15 to the carriage 9 and extending over a sheave in the form of a roller 16 rotatably mounted in a bracket 17 welded or otherwise fastened to the transverse rail 3.

The belt 14 extends rearwardly and downwardly in portion 18 (FIG. 3) to the drum of a winch 20 which is operated by a crank handle 21 rotatably mounted about an axle 22. The winch may be of any desired type or configuration, but is typically similar to the type of winch used on boat trailers.

Figure 5:
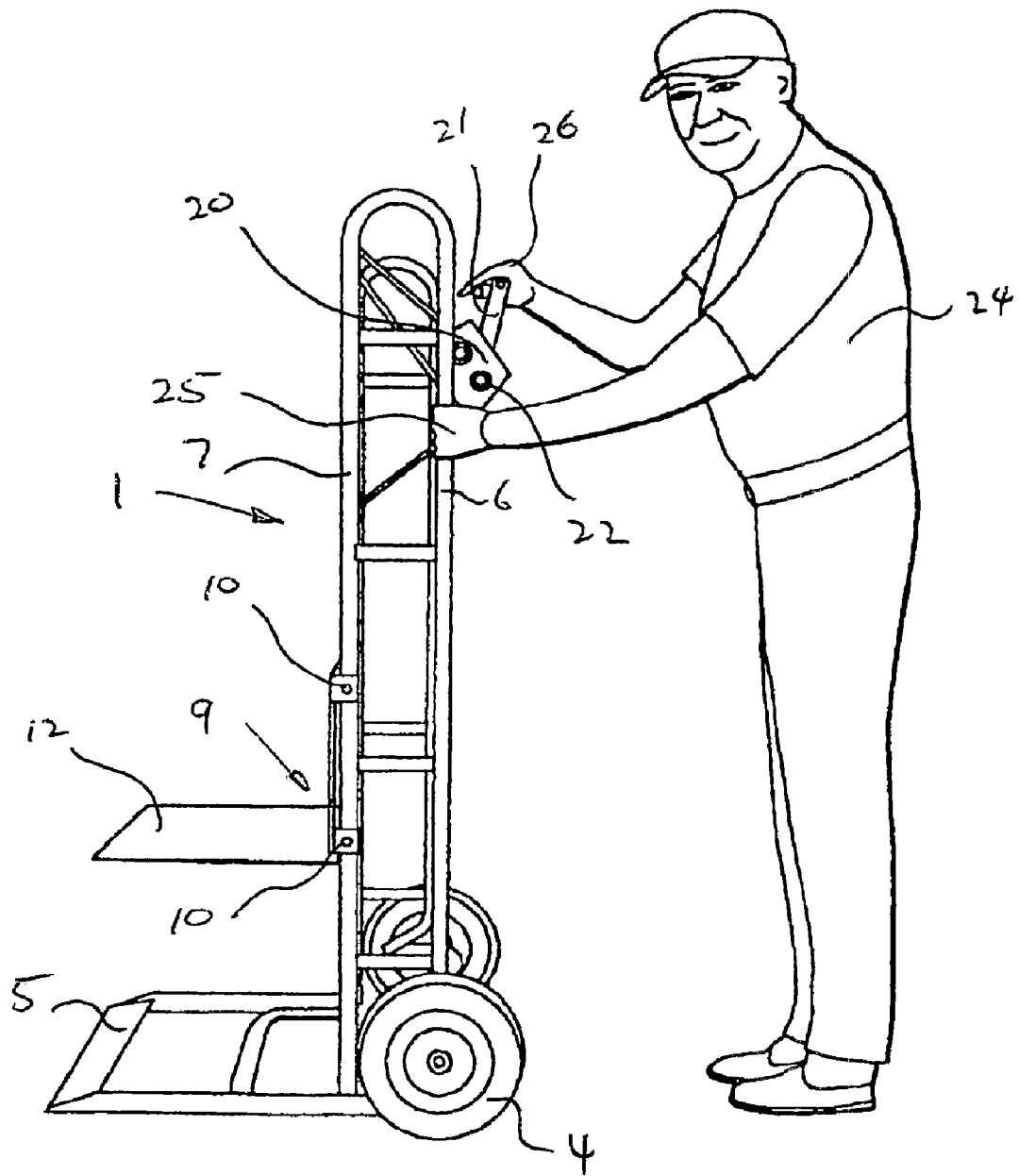
FIG. 5 is a side view of the hand trolley according to the invention in use showing the ergonomic positioning of an operator.

The winch is mounted on a bracket 23 extending downwardly and rearwardly, toward the operator, from the transverse rail 3. In this manner, the winch is positioned in a location which facilitates correct ergonomic operation by an operator 24 as can be clearly seen in FIG. 5. The operator, while standing in an ergonomically correct position, is able to grasp either the transverse rod 3 or the adjacent side frame member 6 (as shown in FIG. 5) with one hand 25 while the other hand 26 operates the crank handle 21. In this manner, the operator is able to stabilise the trolley and its attendant load (not shown) during the raising operation with his left hand 25 while being positioned to apply the required amount of force to the crank handle 21 using the right hand 26 in an ergonomically sound manner.

This is facilitated, by the orientation and location of the winch 20 adjacent and just to the rear of the transverse rod 3 in a raised position at or toward the top of the trolley. Because the belt 18 is entrained over roller 16 at the very top of the trolley, when in the lifting position, the maximum amount of height is able to be reached by the load support carriage 9.

Figure 2:
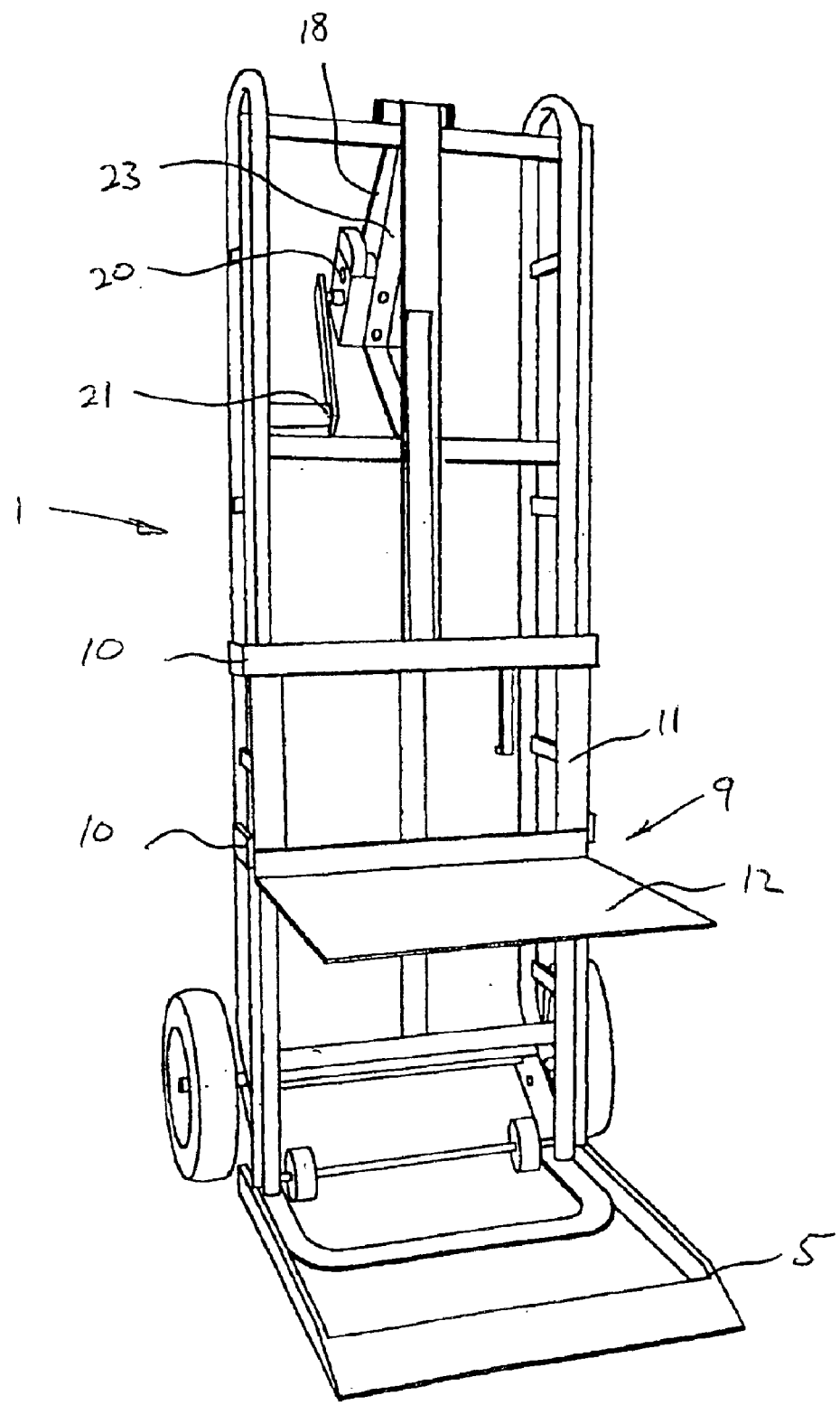
FIG. 2 is a similar view to FIG. 1 with the load lifting carriage in a partially raised position.
Figure 3:
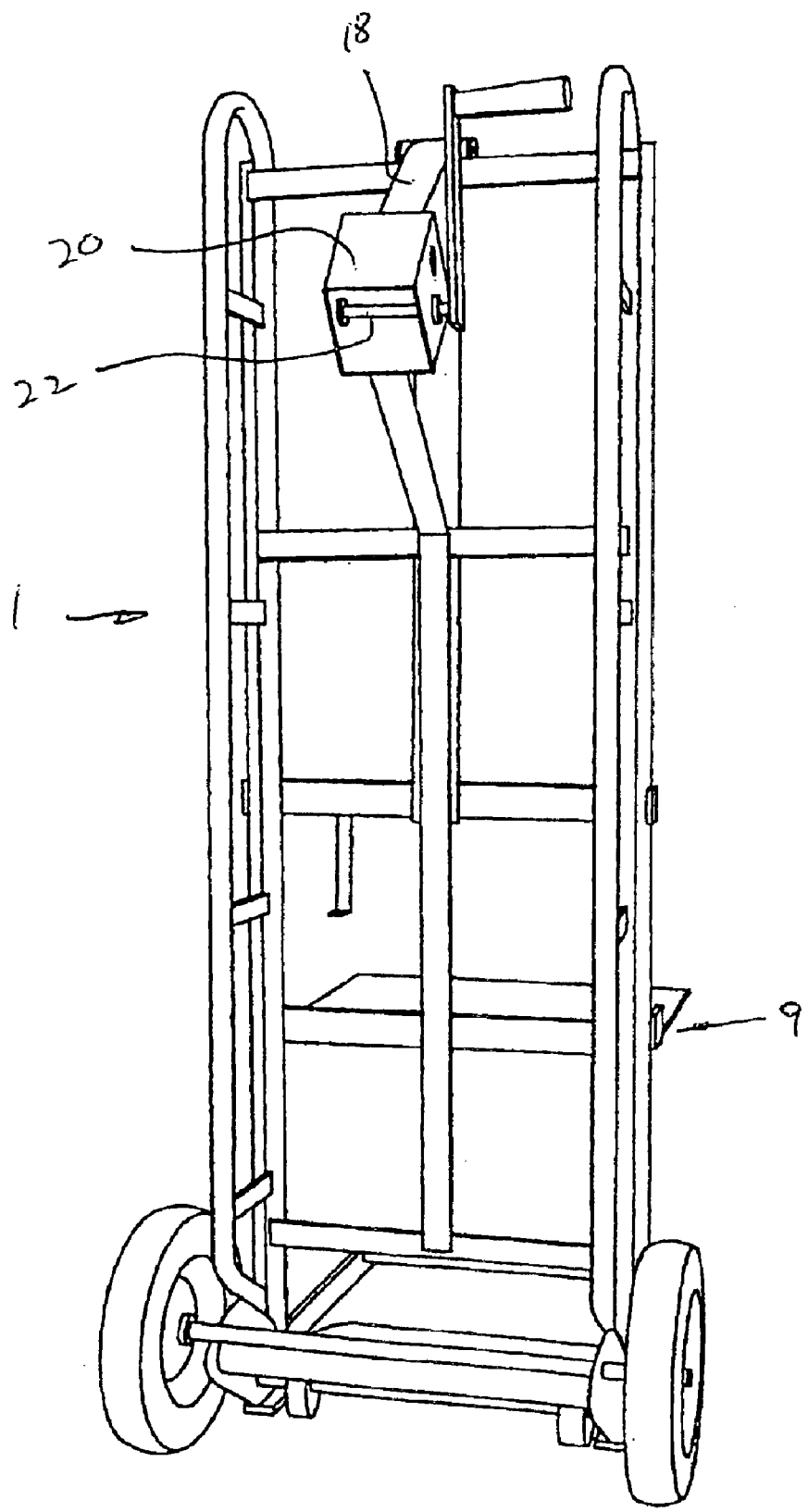
FIG. 3 is a rear perspective view of the configuration shown in FIG. 2.

The construction and arrangement of the trolley according to the invention enables a heavy load to be engaged by the operator at ground level by sliding the base platform 5, and the lifting surface 12 in the lowered position (as shown in FIG. 1) beneath the load. The operator may then wheel the load to a required unloading position in a conventional manner and then operate the winch 20 from the position shown in FIG. 5 to raise the load support carriage and the load through an intermediate position as shown in FIGS. 2, 3 and 5, to the desired raised position. The raised load may then be slid forwardly from the lifting surface 12 onto an elevated position aligned with the raised lifting surface.

This is particularly suitable for loading a heavy load onto the bed of a truck, or into the back of a motor vehicle, or onto an elevated platform.

Figure 4:
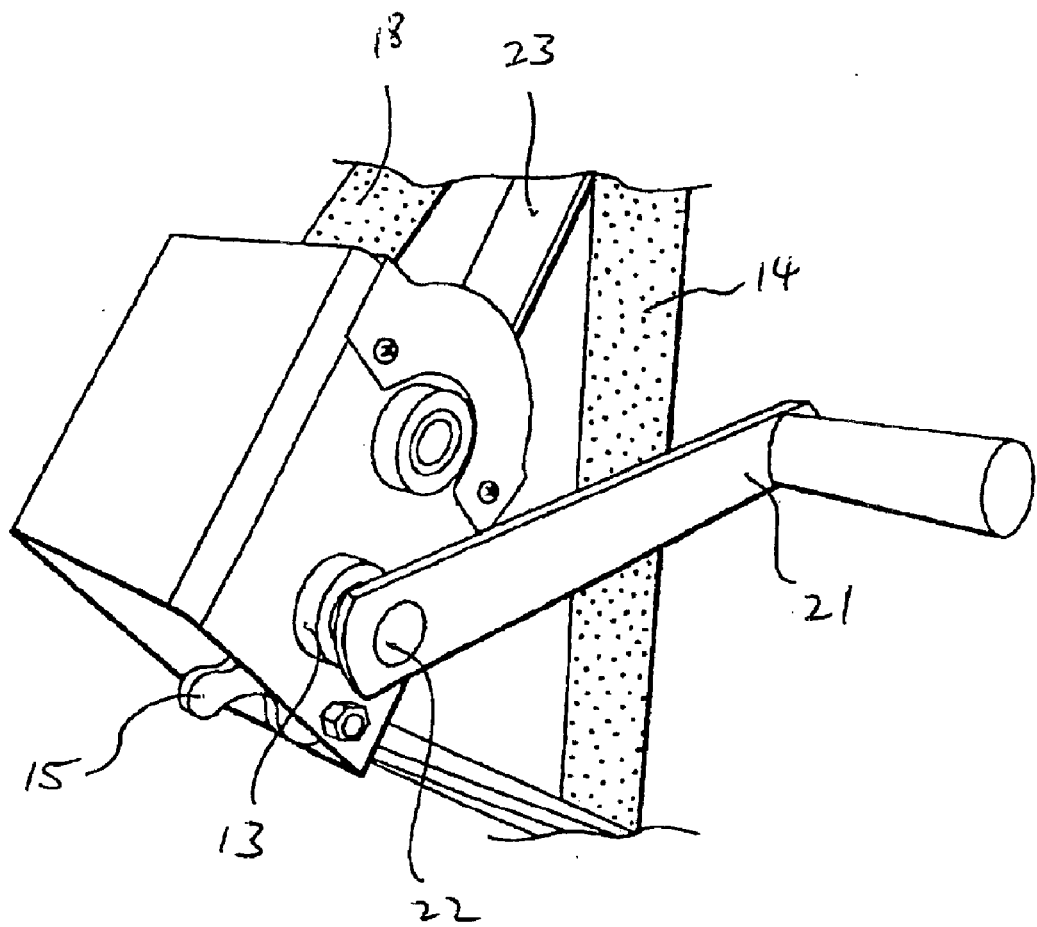
FIG. 4 is a scrap view to an enlarged scale of the winch and handle used in the hand trolley according to the invention.

Similarly the trolley may be used in a reverse configuration to receive a load from an elevated position and safely lower it to ground or floor level. To ensure that the load can be lowered safely, the winch is preferably provided with a brake 13 actuated by movement of lever 15 (FIG. 4) to allow the load to be lowered in a controlled manner.

It is a further feature of the hand trolley design according to the invention, that it is able to be applied to a well known form of hand trolley construction, enabling a simple and inexpensive yet robust and ergonomically correct load elevating trolley to be constructed.

What is claimed is:

1. A hand trolley comprising:
    a load supporting chassis including an uppermost transverse frame rail;
    a pair of support wheels located toward one end of the chassis;
    a base platform extending from the chassis adjacent the wheels arranged to support the chassis in a substantially upright position for loading of the trolley;
    a hand grip located toward the opposite end of the chassis from the wheels,
    a load lifting carriage movably mounted to the chassis;
    a lifting tendon extending from the carriage to a winch located proximate the hand grip on the opposite side of the chassis to the carriage, the winch having an operating handle rotatable about an axle extending transversely relative to the chassis and substantially parallel with the axis of the pair of support wheels, wherein, during cranking of the winch, the handle is positioned between the side frames and below the uppermost transverse frame rail.

2. A hand trolley including a load supporting chassis including spaced side frames, a pair of support wheels located toward one end of the chassis, a base platform extending from the chassis adjacent the wheels arranged to support the chassis in a substantially upright position for loading of the trolley, and a hand grip located toward the opposite end of the chassis from the wheels,
    the hand trolley being provided with a load lifting carriage slideably mounted to the chassis and a lifting tendon extending from the carriage to a winch located proximate the hand grip on the opposite side of the chassis to the carriage, the winch having an operating handle rotatable about an axle extending transversely relative to the chassis and substantially parallel with the axis of the pair of support wheels,
    wherein the handle defines a substantially circular path during cranking such that the handle is positioned within a plane defined between the side frames along at least a forward portion of the path.

3. A hand trolley as claimed in claim 2 wherein the axle of the winch handle is positioned relative to the hand grip so as to facilitate an operator cranking the operating handle in one hand while holding the hand grip in the other hand.

4. A hand trolley as claimed in claim 2 wherein the tendon comprises a belt anchored at one end to the carriage and extending to the winch.

5. A hand trolley as claimed in claim 2 wherein the winch is supported on a bracket extending downwardly and rearwardly, toward the operator, from the hand grip end of the chassis.

6. A hand trolley as claimed in claim 2 wherein the chassis includes a transverse frame rail extending across the upper end of the chassis and a belt extends over a sheave in the form of a roller rotatably mounted to a bracket secured to the transverse frame rail.

7. A hand trolley as claimed in claim 2 wherein the carriage includes a lifting surface extending outwardly from the chassis substantially parallel to the base platform.

8. A lift-and-tilt hand trolley comprising:
    a load supporting chassis including a pair of spaced side frames, each of the side frames defining a hand grip;
    first and second support wheels fixed at a right angles relative to respective sides of the chassis, the wheels being provided on the chassis opposite the hand grips;
    a base platform extending from the chassis adjacent the wheels arranged to support the chassis in a substantially upright position for loading of the trolley;
    a load lifting carriage movably mounted to the chassis;
    a lifting tendon extending from the carriage; and
    a winch located proximate the hand grip on the opposite side of the chassis to the carriage, the winch having a crank rotatable about an axle extending transversely relative to the chassis and substantially parallel with the axis of the pair of support wheels, wherein:

the crank includes a lever provided to the winch and an operating handle provided to the lever and substantially parallel to the axle, and during cranking of the winch, the handle defines a substantially circular path, such that the handle is positioned within a plane defined between the side frames along at least a forward portion of the path.

9. A hand trolley as claimed in claim 8 wherein the axle of the crank is positioned rearwardly of the chassis, while the load lifting carriage is positioned forwardly of the chassis.

10. A hand trolley as claimed in claim 8 wherein each of the first and second support wheels is supported on a single axle.

11. A hand trolley as claimed in claim 8 wherein only the wheels support the chassis during transport, and only the wheels and the load lifting carriage support the chassis during rest when the trolley is in the upright position.

12. A hand trolley as claimed in claim 8 wherein a plane of the load lifting carriage is positioned below a common axis of the wheels in a lowermost position.

13. A hand trolley as claimed in claim 8 further comprising a brake provided to the winch.

14. A hand trolley as claimed in claim 8 wherein the load lifting carriage includes at least one upright back portion aligned with the chassis.

15. A hand trolley as claimed in claim 8 wherein an end of the lifting tendon is anchored in the axle so as to allow winding of the lifting tendon about the axle.

16. A hand trolley as claimed in claim 8 further comprising an uppermost transverse frame rail positioned adjacent each said hand grip.

17. A hand trolley as claimed in claim 16 further comprising a roller provided to said uppermost transverse frame rail, the roller guiding said lifting tendon between the winch to the load lifting carriage.

18. A hand trolley as claimed in claim 16 wherein, during cranking of the winch, the handle is positioned below the uppermost transverse frame rail along said portion of said path.

19. A hand trolley as claimed in claim 18 wherein, during cranking of the winch, the handle is positioned between the uppermost transverse frame rail and an additional transverse frame rail below the uppermost transverse frame rail.

* * * * *

UNITED STATES PATENT AND TRADEMARK OFFICE
CERTIFICATE OF CORRECTION

PATENT NO. : 6,921,095 B2
DATED : July 26, 2005
INVENTOR(S) : Middleby, R.

It is certified that error appears in the above-identified patent and that said Letters Patent is hereby corrected as shown below:

<u>Title page,</u>
Item [30], Foreign Application Priority Data, should read:
-- Feb. 28, 2002 (AU) ........................PS0830 --.

Signed and Sealed this

Twentieth Day of September, 2005

JON W. DUDAS
*Director of the United States Patent and Trademark Office*